United States Patent [19]

Atwell et al.

[11] Patent Number: 4,929,573
[45] Date of Patent: May 29, 1990

[54] HIGHLY DENSIFIED BODIES FROM ORGANOPOLYSILOXANES FILLED WITH SILICON CARBIDE POWDERS

[75] Inventors: William H. Atwell; Gary T. Burns; Chandan K. Saha, all of Midland, Mich.

[73] Assignee: Dow Corning Corporation, Midland, Mich.

[21] Appl. No.: 249,036

[22] Filed: Sep. 26, 1988

[51] Int. Cl.$^5$ ............................................. C04B 35/52
[52] U.S. Cl. ....................................... 501/90; 501/88; 501/89
[58] Field of Search ..................... 501/88, 90, 92, 93

[56] References Cited

U.S. PATENT DOCUMENTS

| | | | |
|---|---|---|---|
| 3,090,691 | 5/1963 | Weyer | 106/39 |
| 3,108,985 | 10/1963 | Weyer | 260/37 |
| 3,485,904 | 12/1969 | Ostrowski | 264/63 |
| 4,004,934 | 1/1972 | Prockazka et al. | 106/44 |
| 4,041,117 | 8/1977 | Prockazka et al. | 264/63 |
| 4,081,284 | 3/1978 | Prockazka et al. | 106/44 |
| 4,122,139 | 10/1978 | Yajima et al. | 264/44 |
| 4,255,316 | 3/1981 | Blizzard | 260/375 B |
| 4,269,753 | 5/1981 | Mine et al. | 260/33.45 B |
| 4,269,757 | 5/1981 | Mine et al. | 260/375 B |
| 4,289,720 | 9/1981 | Yajima et al. | 264/63 |

OTHER PUBLICATIONS

Yajima et al.; "Pyrolysis of a Polyborodiphenylsiloxane", 266 Nature 521, (1977).
Yajima et al.; "SiC and Si$_3$N$_4$ Sintered Bodies with New Borodiphenylsiloxane Polymers as Binder," 266 Nature 522, (1977).

Primary Examiner—William R. Dixon, Jr.
Assistant Examiner—Alan Wright
Attorney, Agent, or Firm—James E. Bittell; Roger E. Gobrogge

[57] ABSTRACT

The preparation of highly densified ceramic bodies by the sintering of certain organopolysiloxanes filled with silicon carbide powders, and metal-containing sintering aids is described. Such highly densified ceramic bodies can be prepared by either a pressureless sintering process or a hot press sintering process. The compositions of this invention can be formed into desired shapes and then sintered to form ceramic, shaped bodies with high densities. One advantage of the present invention is that the green bodies have relative high strengths and thus can be easily handles and, if desired, machined before sintered. The organopolysiloxanes useful in this invention must yield a ceramic char which contains free or excess carbon in addition to carbon in the form of silicon carbide upon pyrolysis to elevated temperatures.

31 Claims, No Drawings

HIGHLY DENSIFIED BODIES FROM ORGANOPOLYSILOXANES FILLED WITH SILICON CARBIDE POWDERS

BACKGROUND OF THE INVENTION

This invention relates to the preparation of highly densified ceramic bodies by the pyrolysis of certain organopolysiloxanes filled with silicon carbide powders and certain metal-containing sintering aids. Such highly densified ceramic bodies can be prepared by either a pressureless sintering process or a hot press sintering process. This invention also relates to novel compositions of matter consisting essentially of silicon carbide powder, a metal-containing sintering aid, and a preceramic orqanopolysiloxane. These compositions of matter can be formed into desired shapes and then sintered to form ceramic, shaped bodies with high densities. One advantage of the present invention is that the green bodies have relative high strengths and thus can be easily handled and, if desired, machined before sintering.

Prockazka in U.S. Pat. Nos. 4,004,934 and 4,041,117 and Prockazka et al. in U.S. Pat. No. 4,081,284 describe high density silicon carbide ceramic bodies prepared in a pressureless sintering process. Such ceramic bodies were prepared from mixtures consisting of silicon carbide powder, a boron-containing additive, and a carbonaceous additive. The carbonaceous additives or binders were high molecular weight, carbon-based aromatic compounds such as phenol-formaldehyde condensate-novolak, resorcinol-formaldehyde, aniline-formaldehyde, cresol-formaldehyde, derivatives of polynuclear aromatic hydrocarbon compounds contained in coal tar, polyphenylene, polymethylphenylene, and the like. Ceramic silicon carbide materials with greater than 85% of theoretical density were obtained.

Onda et al. in Japanese Kokai Patent No. 60-16869 describe a method of preparing high density silicon carbide ceramics which involves pressureless sintering a mixture consisting of silicon carbide powder, an auxiliary sintering aid, and an organosilicon polymer characterized by a Si-C skeletal structure. Disclosed sintering aids include boron-, aluminum-, and beryllium-containing compounds. The organosilicon polymers were described as "high-molecular-weight organic silicon-containing compounds with silicon-carbon skeletal structures." The organosilicon polymers were not further identified even in the examples. Based on this limited description, however, it appears likely that the organosilicon polymers were polycarbosilanes which have a Si-C skeletal backbone.

The present invention provides high density ceramic products from a pressureless sintering process using organopolysiloxanes as binders. Generally, high density ceramic materials will possess high strengths.

THE INVENTION

This invention relates to a method of preparing a sintered body of silicon carbide, said method comprising (a) forming a handleable green body by (i) preparing an intimate mixture consisting essentially of silicon carbide powder, a metal-containing sintering aid, and a preceramic orqanopolysiloxane, where the metal-containing sintering aid is present at 0.1 to 3.0 weight percent of the metal based on the weight of silicon carbide powder and where the preceramic organopolysiloxane is present at such a level that the free carbon value of the mixture is greater than 0.2 weight percent based on the total weight of the silicon carbide powder and the char derived from the preceramic orqanopolysiloxane and (ii) then forming the intimate mixture into the desired shape under pressure at a temperature less than about 500° C. to obtain a handleable green body; and (b) sintering the handleable green body in an inert atmosphere at a temperature greater than 1900° C. to obtain a sintered body of silicon carbide with a density greater than 2.4 g/cm$^3$.

This invention also relates to a method of forming a handleable green body, which method comprises (a) preparing an intimate mixture consisting essentially of silicon carbide powder, a metal-containing sintering aid, and a preceramic organopolysiloxane, where the metal-containing sintering aid is present at 0.1 to 3.0 weight percent of the metal based on the weight of silicon carbide powder and where the preceramic organopolysiloxane is present at such a level that the free carbon value of the mixture is greater than 0.2 weight percent based on the total weight of the silicon carbide powder and the char derived from the preceramic organopolysiloxane; and (b) forming the intimate mixture into the desired shape under pressure at a temperature less than about 500° C.

This invention additionally relates to a uniform mixture consisting essentially of silicon carbide powder, a metal-containing sintering aid, and a preceramic organopolysiloxane, where the metal-containing sintering aid is present at 0.1 to 3.0 weight percent of the metal based on the weight of silicon carbide powder and where the preceramic organopolysiloxane is present at such a level that the free carbon value of the mixture is greater than 0.2 weight percent based on the total weight of the silicon carbide powder and the char derived from the preceramic organopolysiloxane.

This application is closely related to a copending application, which is hereby incorporated by reference, entitled "Curable Organopolysiloxanes Filled with Silicon Carbide Powders and Highly Densified Sintered Bodies Therefrom" by the same inventors and filed on the same date as the present application. This copending application describes the use of curing agents in organopolysiloxane filled with silicon carbide.

The present invention is concerned with the preparation of highly densified sintered bodies from organopolysiloxanes filled with silicon carbide powder. The sintered bodies produced from the practice of this invention have densities greater than about 75% of theoretical (i.e., densities greater than about 2.4 g/cm3). Such highly densified bodies are useful as light weight refractory ceramics. The theoretical density of silicon carbide is 3.21 g/cm$^3$.

The novel compositions of the present invention consist essentially of an organopolysiloxane filled with silicon carbide powder and a metal-containing sintering aid. These novel compositions can be used to prepare handleable green bodies. By "handleable green bodies" we mean green bodies which have sufficient green strength to be handled or machined prior to sintering. The high green strength is one significant advantage of the present invention; the high green strength allows the green body to be further processed and shaped prior to the final sintering step. Generally, green strengths of 500 psi or more may be obtained in the practice of this invention.

The green bodies may be formed by conventional techniques known in the art. Such methods include pressure molding, uniaxial pressing, isopressing, extrusion, transfer molding, injection molding and the like. The formed green bodies may be further shaped by machining if desired. Once shaped, the green bodies are fired to an elevated temperature under an inert atmosphere to convert the green bodies into ceramic articles having densities greater than about 75% of theoretical. It is preferred that the density of the ceramic article be greater than about 85% of theoretical (2.7 g/cm$^3$). It is more preferred that the density be greater than about 2.9 g/cm$^3$ (90% of theoretical); it is most preferred that the density be greater than about 3.05 g/cm$^3$ (95% of theoretical). The sintering step may be carried out using either a pressureless sintering process or a hot press sintering process. When employing the compositions of this invention, either process will produce a highly densified ceramic article. The hot press sintering process will generally produce higher density ceramic articles. Therefore, if the maximum density is desired, a hot press sintering process would be preferred. Generally, however, the pressureless sintering process is preferred because of the simplified operations involved. The sintering or pyrolysis step is carried out under an inert atmosphere such as nitrogen or argon The growth of alpha-SiC grains can be reduced by sintering under a nitrogen-containing atmosphere.

The sintering step to the final ceramic product is generally carried out at a temperature of about 1900° C. or higher. Lower temperatures can be used but the ceramic product may not possess the desired density. The preferred sintering temperature is about 2000° to 2200° C. with about 2150° C. being most preferred.

The organopolysiloxanes useful in this invention are generally well known in the art. The organopolysiloxanes must be capable of being converted to ceramic materials with a significant ceramic char yield. Generally, the ceramic char yield should be greater than about 20 weight percent. Naturally, there will be less shrinkage if the ceramic char yield is higher. Therefore, it is preferred that orqanopolysiloxanes with ceramic char yields greater than about 40 weight percent be employed in the practice of this invention. The organopolysiloxane must also yield a ceramic char containing free carbon. Using a rule of mixtures, the ceramic char must contain greater than about 30 weight percent total carbon in order for free carbon to be present. Organopolysiloxanes which yield ceramic chars with greater than about 40 weight percent total carbon are preferred. A 40 weight percent carbon-containing ceramic material contains, based on a rule of mixtures, about 86 weight percent SiC and 14 weight percent free carbon. Most preferred are organopolysiloxanes which yield ceramic chars with greater than about 50 weight percent total carbon; a 50 weight percent carbon-containing ceramic material contains, based on a rule of mixtures, about 72 weight percent SiC and 28 weight percent free carbon. It is generally preferred that the ceramic char contain at least 10 weight percent free carbon. It is more preferred that the ceramic char contain at least 25 weight percent free carbon.

So long as the organopolysiloxane can be converted to a ceramic char with sufficient char yield and the derived ceramic char contains sufficient free carbon, the structure of the organopolysiloxane is not critical. The organopolysiloxane ma contain units of general structure [R$_3$SiO$_{0.5}$], [R$_2$SiO], [RSiO$_{1.5}$], and [SiO$_2$]

where each R is independently selected from the group consisting of hydrogen, alkyl radicals containing 1 to 20 carbon atoms, phenyl radicals, and vinyl radicals. Generally, organopolysiloxanes which contain phenyl groups are preferred as such groups easily allow for the formation of ceramic chars with sufficient free carbon. Organopolysiloxanes which contain vinyl groups are also preferred since vinyl groups attached to silicon provide a mechanism whereby the organopolysiloxane can be cured prior to sintering. Preferred orqanopolysiloxanes contain varying amounts of [PhSiO$_{1.5}$], [MeSiO$_{1.5}$], and [PhViSiO] units. Especially preferred orqanopolysiloxanes are described by the unit formula

[PhSiO$_{1.5}$][MeSiO$_{1.5}$][PhViSiO]

where there are 10 to 90 mole percent [PhSiO$_{1.5}$] units 0 to 50 mole percent [MeSiO$_{1.5}$] units, and 10 to 90 mole percent [PhViSiO] units more preferably, there are 20 to 30 mole percent [PhSiO$_{1.5}$] units, 30 to 50 mole percent [MeSiO$_{1.5}$] units, and 30 to 50 mole percent [PhViSiO] units. Organopolysiloxanes useful in this invention may contain other siloxane units in addition to, or in place of, the siloxane units just mentioned. Examples of such siloxane units include [ViSiO$_{1.5}$], [PhMeSiO], [MeHSiO], [MeViSiO], [Ph$_2$SiO], [Me$_2$SiO], [Me$_3$SiO$_{0.5}$], and the like. Mixtures of organopolysiloxanes may also be employed. Generally, organopolysiloxanes where R is almost exclusively methyl are not suitable for use in this invention as there is insufficient free carbon in the resulting ceramic char.

The organopolysiloxanes of this invention can be prepared by techniques well known in the art. The actual method used to prepare the organopolysiloxanes is not critical. Most commonly, the organopolysiloxanes are prepared by the hydrolysis of organochlorosilanes. Such methods, as well as others, are described in Noll, *Chemistry and Technology of Silicones,* chapter 5 (translated 2d Ger. Ed., Academic Press. 1968). Specific methods for preparation of suitable organopolysiloxanes are illustrated in the examples included in the present specification.

In addition to the organopolysiloxane, other components in the compositions of this invention include silicon carbide powder and a metal-containing sintering aid. The silicon carbide powders useful in this invention are commercially available. Both alpha-SiC and beta-SiC powders, as well as mixtures, can be used. Generally, SiC powders with an average particle size of less than five microns are preferred; powders with an average particle size of less than one micron are more preferred.

Suitable metal-containing sintering aids include iron, Fe$_3$C, magnesium, MgC$_3$, lithium, Li$_2$C$_2$, beryllium, Be$_2$C, boron, boron-containing compounds, aluminum, aluminum-containing compounds, and metal oxides such as thorium oxide, yttrium oxide, lanthanum oxide, and cerium oxide. Many of these metal-containing sintering aids are described in Negita, "Effective Sintering Aids for Silicon Carbide Ceramics: Reactivities of Silicon Carbide with Various Additives," 69 J. Am. Ceram. Soc. C-308 (1986). Other metal-containing sintering aids suggested by Negita might also be effective in the practice of this invention. Generally, the sintering aid should be present at an amount equivalent to about 0.1 to 3.0 weight percent of the metal based on the weight of the silicon carbide powder. Preferred sintering aids are selected from the group consisting of boron, boron-containing compounds, aluminum, and aluminum-containing compounds. Examples of boron-containing sintering aids include boron carbide, lithium borohydride, trivinylboron, triphenylboron, silicon hexaboride, $H_3BO_3$, $B_2O_3$, and the like. Examples of aluminum-containing sintering aids include aluminum oxide, aluminum nitride, aluminum diboride, and the like. The most preferred sintering aids are boron and boron carbide. Mixtures of sintering aids may also be used.

The preceramic organopolysiloxane is present in the compositions of the present invention at such a level that the free carbon value of the composition is greater than 0.2 weight percent based on the total weight of the silicon carbide powder and the char derived from the preceramic organopolysiloxane.

What is meant by "free carbon value of the mixture" in this invention is the amount of free or excess carbon derived from the organopolysiloxane during pyrolysis as expressed by a weight percentaqe based on the total weight of the silicon carbide powder and the char derived from the organopolysiloxane. The total amount of carbon in the ceramic char equals the amount of free or excess carbon plus the amount of carbon in the form of silicon carbide. The amount of free carbon derived from the organopolysiloxane is determined by pyrolysis of the organopolysiloxane, in the absence of any silicon carbide powder or sintering aid, to an elevated temperature under an inert atmosphere until a stable ceramic char is obtained. For purposes of this invention, a "stable ceramic char" is defined as the ceramic char produced at an elevated temperature which will not significantly decrease in weight upon further exposure at the elevated temperature. Normally, a stable ceramic char is produced upon pyrolysis at 1800° C. for about 30 minutes. Other elevated temperatures can be used to form the stable ceramic char but the length of exposure to elevated temperature will need to be increased for temperatures less than 1800° C. Both the ceramic yield and the carbon content of the stable ceramic char are then determined. Using a rule of mixtures, the amount of SiC and free carbon of the stable ceramic char can be calculated. The amount of free carbon normally is expressed as weight of free carbon produced per gram of preceramic organopolysiloxane. Knowing the amount of free carbon produced by pyrolysis of the organopolysiloxane, one can determine how much organopolysiloxane is required to obtain an organopolysiloxane/silicon carbide mixture with the desired free carbon value. Naturally, if one is using the same or very similar organopolysiloxane to prepare a sintered body, it is not required that the amount of free carbon produced per gram of organopolysiloxane be determined every time.

This procedure can perhaps be best illustrated by example. Assume an organopolysiloxane (100 g) which gives, upon pyrolysis to 1800° C., a char yield of 50 weight percent which contains 40 weight percent carbon and 60 weight percent silicon. Such a char contains 30 g (1.07 moles) silicon. Using a rule of mixtures, the char also contains 1.07 moles (12.8 g) of carbon in the form of SiC. Since the char contains 20 g carbon, the amount of free carbon in the char is 7.2 g (20 g minus 12.8 g). Thus each gram of the preceramic organopolysiloxane yields 0.072 g free carbon. If a free carbon value for the mixture of 1.5 weight percent is desired, the following calculations can be preformed. Let X equal the amount of organopolysiloxane required. The amount of char derived from the organopolysiloxane is 0.5X (in grams, based on a 50% char yield): the amount of free carbon formed during the pyrolysis is 0.072X (in qrams). For a mixture containing 100 g of SiC powder, the equation $$0.015 = (0.072X)/(100 + 0.5X)$$

is obtained where 0.072X is the amount of free carbon derived from the organopolysiloxane and (100+0.5X) is the total weight of SiC powder and char derived from the organopolysiloxane. Solving the above equation for X, it is found that 23.3 9 of the organopolysiloxane will give the desired 1.5% free carbon value of the mixture. Using this procedure, the amount of organopolysiloxane required to prepare the compositions of this invention can be determined. This procedure avoids the costly and time consuming trial and error method which might otherwise be required.

The free carbon value of the mixture must be greater than 0.2 weight percent based on the total weight of the silicon carbide powder and the char derived from the organopolysiloxane. For free carbon values less than about 0.2 weight percent the density of the sintered body will generally fall below about 2.4 g/cm$^3$ (75% of theoretical). It is generally preferred that the free carbon value of the mixture is greater than 0.5% and that the density of the resulting sintered body be greater than about 85% of theoretical. It is more preferred that the free carbon value of the mixture be between 0.5 and 3.0 weight percent with a range of 1.0 to 2.0 weight percent being even more preferred. The optimum density is generally obtained when the free carbon value of the mixture is about 1.5 weight percent.

Once the amount of organopolysiloxane required in the mixture has been determined, the various components are combined in a manner that assures a uniform and intimate mixture. Such a mixture is required to avoid areas of varying density throughout the sintered product. Uniform and intimate mixtures can be prepared by using conventional blending techniques. Examples of such techniques include grinding the various powders in either the dry or wet state. Generally preferred is wet grinding where the various powder are mixed and ground with organic solvents, the solvent removed, and then the resulting mixture is further ground. Other mixing and grinding methods will be apparent to those skilled in the art. The uniform and intimate mixture may then be formed into the desired shape. Preferably, the desired shape is formed under Pressure using such methods as injection molding, uniaxial pressing, isopressing, extrusion, transfer molding, and the like. Once formed the article may be further shaped by machining. Once the final shape has been obtained, the article is sintered in an inert atmosphere to a temperature of 1900° C. or more. The preferred sintering temperature is about 2000° to 2200° C. with about 2150° C. being most preferred.

Although not wishing to be limited by theory, it is thought that the free carbon derived from the preceramic organopolysiloxane plays two different roles in the formation of highly densified sintered bodies. First, it helps remove oxygen present in the silicon carbide powder; and secondly, it apparently acts as an additional sintering aid. Silicon carbide powders often contain so called "free carbon." However, the "free carbon" present in the silicon carbide powder does not appear to be as active or effective as free carbon generated in situ from the preceramic organopolysiloxane. It is not clear whether the free carbon produced in situ is more active chemically or whether it is simply more evenly dispersed. In any event, when the free carbon value of the mixture (as defined earlier) is about 1.5 weight percent, sintered bodies with optimum densities are obtained.

So that those skilled in the art can better appreciate and understand the invention, the following examples are given. Unless otherwise indicated, all percentages are by weight. Throughout this specification "Me" represents a methyl group, "Ph" represents a phenyl group, and "Vi" represents a vinyl group.

In the following examples, the analytical methods used were as follows,

Proton NMR spectra were recorded on either a Varian EM360 or EM390 spectrometer; fourier transform IR spectra were recorded on a Nicolet 5 DX spectrometer. Gel permeation chromatoqraphy (GPC) data were obtained on a Waters GPC equipped with a model 600E systems controller, a model 490 UV and model 410 Differential Defractometer detectors: all values are relative to polystyrene.

Carbon analysis was done on a Control Equipment corporation 240-XA Elemental Analyzer. Oxygen analysis was done on a Leco Oxygen Analyzer equipped with an Oxygen Determinator 316 (Model 783700) and an Electrode Furnace EF100. Silicon was determined by a fusion technique which consisted of converting the silicon material to soluble forms of silicon and analyzing the solute for total silicon by atomic absorption spectrometry.

Compounding was done on a Brabender Plasticorder (Model PL-V151) equipped with roller blades. Test bars were formed on a Carver laboratory press (Fred S. Carver Inc., Summit, N.J.). Pyrolysis was carried out in an Astro graphite element tube furnace Model 1000-3060-FP12 equipped with an Eurotherm Controller/Programmer Model 822. Flex strengths (using the fourpoint bend technique) were determined on either a Model TTC or Model 8562 Instron instrument.

The SiC powder used was Ibiden UF silicon carbide which is a mixture of about 5 to 8% alpha-SiC and 92 to 95% beta-SiC. The boron used was amorphous boron powder from Cerac Inc.

EXAMPLE 1.

Sintered Bodies from $(PhViSiO)_{0.5}(MeHSiO)_{0.5}$.

A. Polymer Synthesis.

A solution of 20.32 g (0.10 moles) of $PhViSiCl_2$ and 11.50 g (0.10 moles) of $MeHSiCl_2$ in about 100 mL toluene was added dropwise to a stirring mixture of 37.1 g (0.35 moles) of $Na_2CO_3$ in 300 mL water. After stirring for about a half hour, the organic layer was collected and dried over $MgSO_4$. The toluene solution was filtered through a sintered glass frit. Concentration of the filtrate gave 16.6 g (79.6% yield) of a cloudy, viscous oil. IR (KBr, thin film): 3331 (broad, s), 3073 (w), 3032 (w), 3015 (w), 2972 (m), 2953 (w), 2164 (m), 1595 (w), 1427 (m), 1406 (m), 1271 (s), 1124 (s), 1082 (s), 907 (s), 872 (s), 766 (m), 702 cm$^{-1}$ (m).

B. Char Composition Calculations

A sample of the above polymer under argon was heated to 1500° C. at 10° C./min and held at 1500° C. for two hours before cooling to room temperature. The sample had a mass retention of 39.1% and contained 47.9% carbon, 48.9% silicon, and 0.9% oxygen. The following calculations were made: 100 g of cured polymer gives 39.1 g of a ceramic char consisting of 47.9% carbon and 52.1% silicon (by difference). (In order to simplify the calculations, the amount of oxygen has been ignored.) The char consists of 29.1 g SiC (74%) and 10.0 g carbon (26%). Therefore, each gram of polymer, after pyrolysis, gives 0.291 g SiC and 0.100 g free carbon.

C. Test Bar Fabrication

A siloxane/SiC mixture was prepared using the following procedure: 10.00 g of the above siloxane polymer dissolved in 150 mL toluene was mixed with 50 g Ibiden SiC powder and 0.25 g boron in an ultrasonic bath for 5 minutes. The free carbon value of the blend was 1.9%. The slurry was transferred to a resin kettle and the solvent removed under vacuum. The residue was further dried. The dried powder was ground in a mortar and pestle and then passed through a 90 μm mesh sieve. The sieved powder was dry pressed into test bars (35×8×2 mm) in a tungsten carbide lined die with a Carver laboratory press at 26 ksi. The test bars were fired to 2100°–2120° C. in an Astro tube furnace (argon atmosphere) using the following temperature program: room temperature to 300° C. at 26.7° C./min, 300° to 700° C. at 25° C./min, 700° to 1350° C. at 20° C./min, 1350° C. for 30 minutes, 1350° C. to the final temperature at 20° C./min, and at the final temperature for 30 minutes. The density of the fired test bars averaged 2.71 g/cm$^3$ (about 85% of theoretical).

EXAMPLE 2

Sintered Bodies from $(MeSiO_{1.5})_{0.25}$ $(PhMeSiO)_{0.50}(PhSiO_{1.5})_{0.15}(Ph_2SiO)_{0.10}$.

A. Polymer Synthesis.

A mixture of 37.4 g (0.25 moles) $MeSiCl_3$, 95.5 g (0.50 moles) $PhMeSiCl_2$, 31.7 g (.15 moles) $PhSiCl_3$, and 25.3 g (0.10 moles) $Ph_2SiCl_2$ dissolved in 184 g xylene was added (below the water surface) over a six minute period to a three-neck flask containing 86.2 g water and 15.6 g isopropyl alcohol. The flask was equipped with a drainage stopcock, thermometer, condenser, overhead mechanical stirrer, and addition funnel. After stirring for five minutes, the water layer was removed. The resin layer was washed twice with warm tap water and transferred to a 3 liter flask where it was dried by azeotropic distillation and then bodied for 3 hours with zinc octoate (1.4% based on the total weight of the polymer) at 75% solids content. The solvent was removed and the resin dried at 125° C. at 20 torr.

B. Char Composition Calculations

A sample of the siloxane polymer was concentrated under vacuum to remove any remaining solvent and to determine the solids content. The residue was weighed in a graphite crucible and transferred to an Astro tube furnace. The furnace was twice evacuated to less than 20 torr and backfilled with argon. Under an argon purge, the sample was heated to 1800° C. at 10° C./min and held at 1800° C. for 2 hours before cooling to room temperature. The sample had a mass retention of 41.5% and contained 50.0% carbon. The following calculations were made: 100 g of cured polymer gives 41.5 g of a ceramic char consisting of 50.0% (by difference) silicon and 50.0% carbon. The char consists of 29.6 g SiC (71.3%) and 11.9 g carbon (28.7%). Therefore, each gram of polymer, after pyrolysis, gives 0.296 g SiC and 0.119 g free carbon.

C. Test Bar Fabrication

Using the above data, the following mixture was prepared to give a blend with a 2.8% free carbon value and 0.3% boron: 6.69 g of the siloxane polymer (as a 50% solution in xylene) was mixed with 25.15 g Ibiden SiC powder, 0.077 g boron, and 5 to 10 mL toluene in a hardened alumina mortar and pestle until a thick paste was obtained. The paste was dried under vacuum to remove residual solvent. The dried powder was ground in a mortar and pestle and then passed through a 90 μm mesh sieve. The sieved powder was dry pressed into test bars (35×8×2 mm) in a tungsten carbide lined die with a Carver laboratory press at 46 ksi. The test bars had an average flex strength of 1010±41 psi. The test bars were fired to 2100° C. under an argon atmosphere using the same temperature profile as in Example 1 (Part B). The average density of the five fired test bars was 3.13±0.01 g/cm$^3$ (97.4% of theoretical).

EXAMPLE 3

Sintered Bodies from $(PhSiO_{1.5})_{0.21}(MeSiO_{1.5})_{0.29}(PhViSiO)_{0.50}$.

A. Polymer Synthesis.

A solution of 71.76 g (0.35 moles) PhViSiCl$_2$, 31.7 g (0.15 moles) PhSiCl$_3$, and 29.8 g (0.20 moles) MeSiCl$_3$ in 50 mL toluene was added dropwise to a stirring mixture of 180 g Na$_2$CO$_3$ in 400 mL water and 250 mL toluene. After the addition was complete, the reaction mixture was stirred at room temperature for 45 minutes. The two phases were separated and the organic layer collected and concentrated under vacuum. The residue (79.0 g) was dissolved in 88.7 g toluene and refluxed over 0.10 g KOH. After all of the water was removed using a Dean-Stark trap, the toluene solution was cooled to room temperature and about 1.0 mL Me$_3$SiCl was added. After about one hour, the solution was filtered through a medium glass frit. Concentration of the filtrate under vacuum gave 70.9 g (83.8% yield) of a tacky gum. The polymer was dissolved in 150 mL toluene and poured into about 1.5 liters isopropanol. The precipitated polymer was collected and dried at about 200° C. and 1 torr. Proton NMR (CDCl$_3$, delta-values): −0.36 to 0.40 (SiMe, broad singlet), 5.5 to 6.3 (SiVi, broad singlet), and 6.8 to 7.8 (SiPh, broad singlet); the SiMe/SiVi/SiPh molar ratio was 1.0/1.86/2.78.

B. Char Composition Calculations

A sample of the above polymer was weighed into a graphite crucible and transferred into an Astro tube furnace. The furnace was twice evacuated to less than 20 torr and backfilled with argon. Under an argon atmosphere, the polymer sample was heated to 1800° C. at 10°/min and held at 1800° C. for two hours before cooling to room temperature. The sample had a mass retention of 38.6% and contained 52.7% carbon. The following calculations were made: 100 g of cured polymer gives 38.6 g of a ceramic char consisting of 47.3% (by difference) silicon and 52.7% carbon. The char consists of 26.09 g SiC (67.6%) and 12.51 g carbon (32.4%). Therefore, each gram of polymer, after pyrolysis, gives 0.261 g SiC and 0.125 g free carbon.

C. Test Bar Fabrication.

Using the above data from Part B, the following mixture was prepared with a 1.7% free carbon value and 0.3% boron, 3.41 g of the above siloxane polymer dissolved in about 10-15 mL toluene was mixed with 23.6 g Ibiden SiC powder and 0.077 g boron in an hardened alumina mortar and pestle until a thick paste was obtained. The paste was dried under vacuum to remove residual solvent. The dried powder was ground in a mortar and pestle and passed through a 90 μm mesh sieve. The sieved powder was dry pressed into test bars (35×8×2 mm) in a tungsten carbide lined die in a Carver laboratory press at 46 psi. The average flex strength of the green test bars was 650±110 psi. The test bars were fired to 2100° C. under an argon atmosphere at a rate of 10° C./min with 30 minutes at 2100° C. The average density of the five fired test bars was 3.11±0.02 g/cm$^3$ (96.9% of theoretical).

EXAMPLE 4

Sintered Bodies with $(PhSiO_{1.5})_{0.21}(MeSiO_{1.5})_{0.43}(PhViSiO)_{0.36}$.

A. Polymer Synthesis.

A solution of 50.8 g (0.25 moles) PhViSiCl$_2$, 31.7 g (0.15 moles) PhSiCl$_3$, and 44.8 g (0.30 moles) MeSiCl$_3$ in 50 mL toluene was added dropwise to a stirring mixture of 180 g Na$_2$CO$_3$ in 400 mL water and 250 mL toluene. After the addition was complete, the reaction mixture was stirred at room temperature for 45 minutes. The two phases were separated and the organic layer collected and concentrated under vacuum. The residue (75.2 g) was dissolved in about 150 g toluene and the solution refluxed over 0.103 g KOH by collecting the water using a Dean-Stark trap. After the water removal was complete, the toluene solution cooled to room temperature and about 1.0 mL Me$_3$SiCl added. After about one hour, the solution was filtered through a 0.2 μm membrane filter. The filtrate was concentrated under vacuum and the residue dissolved in 150 mL toluene. The toluene solution was poured into about 1.5 liters isopropanol. The precipitated polymer was collected and dried at about 200° C. and 1 torr. The yield was 41.9 g (54.8%). Proton NMR (CDCl$_3$. delta-values): −0.23 to 0.60 (SiMe, broad singlet), 5.6 to 6.4 (SiVi, broad singlet), and 6.9 to 8.0 (SiPh, broad singlet): the SiMe/SiVi/SiPh molar ratio was 2.7/1.0/1.1. GPC molecular weight (THF solvent): M$_w$=4993 and M$_n$=1215.

B. Char Composition Calculations

A sample of the above siloxane was weighed into a graphite crucible and transferred into an Astro tube furnace. The furnace was twice evacuated to less than 20 torr and backfilled with argon. The sample was then fired to 1800° C. (room temperature to 1200° C. at 13° C./min. 1200 to 1800° C. at 5° C./min. and 30 minutes at 1800° C.) under argon. The sample had a mass retention of 47.2% and contained 47.7% carbon. The following calculations were made: 100 g of cured polymer gives 47.2 g of a ceramic char consisting of 52.3% (by difference) silicon and 47.7% carbon. The char consists of 35.3 g SiC (74.8%) and 11.9 9 carbon (25.3%). Therefore, each gram of polymer, after pyrolysis, gives 0.353 g SiC and 0.119 g free carbon.

C. Test Bar Fabrication.

A siloxane/SiC mixture with a free carbon value of 1.5% was prepared using the calculations of Part B above and the following procedure: 3.138 g of above siloxane polymer was mixed with 23.438 g Ibiden SiC powder and 0.075 g boron in a hardened alumina mortar and pestle until a thick paste was obtained. The paste was dried under vacuum to remove residual solvent. The dried powder was ground in a mortar and pestle and then passed through a 90 μm mesh sieve. The sieved powder was dry pressed into test bars (35×8×2 mm) in a tungsten carbide lined die with a Carver laboratory press at 46 ksi. The green test bars had an average flex strength of 1130±70 psi. The test bars were fired to 2050° C. using the following temperature profile: room temperature to 300° C. at 11.2° C./min, 300° to 550° C. at 10° C./min, 550 to 700° C. at 6° C./min, 700° to 1350° C. at 32.4° C./min, 1350° to 2050° C. at 30° C./min, and 2050° C. for 30 minutes. The average density of the fired test bars was 3.01 g/cm$^3$ (93.8% of theoretical). The fired test bars had an average flex strength of 36.9±5.3 ksi.

EXAMPLE 5

Sintered Bodies with $(PhSiO_{1.5})_{0.23}(MeSiO_{1.5})_{0.46}(PhViSiO)_{0.31}$.

A. Polymer Synthesis

A solution of 40.6 g (0.20 moles) PhViSiCl$_2$, 31.7 g (0.15 moles) PhSiCl$_3$, and 44.8 g (0.30 moles) MeSiCl$_3$ in 50 mL toluene was added dropwise to a stirring mixture of 180 g Na$_2$CO$_3$ in 400 mL water and 250 mL toluene. After the addition was complete, the reaction mixture was stirred at room temperature for 45 minutes. The two phases were separated and the organic layer collected and concentrated under vacuum. The residue (75.4 g) was dissolved in 107.6 g toluene and the solution refluxed over 0.128 g KOH. The water was collected in a Dean-Stark trap. After all of the water was removed, the toluene solution was cooled to room temperature and about 1.0 mL Me$_3$SiCl was added. After about one hour, the solution was filtered through a 0.2 μm membrane filter. The filtrate was concentrated under vacuum. The residue was dissolved in 150 mL toluene and poured into about 1.5 liters butanol. The precipitated polymer was collected and dried at about 200° C. and 1 torr. The yield was 34.5 g (49.9%). Proton NMR (CDCl$_3$, delta-values): −0.33 to 0.50 (SiMe, broad singlet), 5.65 to 6.25 (Sivi, broad singlet), and 6.8 to 7.95 (SiPh, broad singlet) the SiMe/SiVi/SiPh molar ratio was 3.0/1.0/1.3.

B. Char Composition Calculations.

A sample of the above polymer was fired to 1800° C. under an argon atmosphere using the following temperature profile: room temperature to 1200° C. at 13° C./min, 1200° to 1800° C. at 5° C./min, and two hours at 1800° C. The sample had a mass retention of 42.6% and contained 46.8% carbon. The following calculations were made: 100 g of cured polymer gives 42.6 g of a ceramic char consisting of 53.2% (by difference) silicon and 46.8% carbon. The char consists of 32.4 g SiC (76.0%) and 10.2 g carbon (24.0%). Therefore, each gram of polymer, after pyrolysis, gives 0.324 g SiC and 0.102 g free carbon.

C. Test Bar Fabrication.

A siloxane/SiC mixture with a free carbon value of 1.9% was prepared using the following procedure: 4.655 g of the above siloxane polymer was mixed with 22.750 g Ibiden SiC powder and 0.074 g boron in a hardened alumina mortar and pestle until a thick paste was obtained. The paste was dried under vacuum to remove residual solvent. The dried powder was ground in a mortar and pestle and then passed through a 90 μm mesh sieve. The sieved powder was dry pressed into test bars (35×8×2 mm) in a tungsten carbide lined die with a Carver laboratory press at 46 ksi. The green test bars had an average flex strength of 1840±134 psi. The test bars were fired to 2050° C. in an argon atmosphere using the same temperature program as in Example 4 above. The average density of the fired test bars was 3.06 g/cm$^3$ (95.3% of theoretical). The fired test bars had an average flex strength of 45.5±6.8 ksi.

That which is claimed is:

1. A method of preparing a sintered body of silicon carbide, said method comprising
   (a) forming a handleable green body by
      (i) preparing an intimate mixture consisting essentially of silicon carbide powder, a metal-containing sintering aid, and a preceramic organopolysiloxane, where the metal-containing sintering aid is present at 0.1 to 3.0 weight percent of the metal based on the weight of silicon carbide powder and where the preceramic organopolysiloxane is present at such a level that the free carbon value of the mixture is greater than 0.2 weight percent based on the total weight of the silicon carbide powder and the char derived from the preceramic organopolysiloxane and
      (ii) then forming the intimate mixture into the desired shape under pressure at a temperature less than about 500° C. to obtain a handleable green body; and
   (b) sintering the handleable green body in an inert atmosphere at a temperature greater than 1900° C. to obtain a sintered body of silicon carbide with a density greater than 2.4 g/cm$^3$.

2. A method as described in claim 1 wherein the free carbon value of the preceramic organopolysiloxane is determined, prior to forming a handleable green body, by heating a known amount of the preceramic organopolysiloxane under an inert atmosphere to an elevated temperature for a time sufficient to convert the preceramic organopolysiloxane into a stable ceramic char material, determining the ceramic char yield and the silicon and carbon content of the stable ceramic char material, and then calculating the amount of free carbon in the stable ceramic char material per part of the preceramic organopolysiloxane and wherein the metal-containing sintering aid is selected from the group consisting of boron, boron-containing compounds, aluminum, and aluminum-containing compounds.

3. A method as described in claim 1 wherein the preceramic organopolysiloxane is present at such a level that the free carbon value of the mixture is greater than 0.5 weight percent and wherein the sintered body of silicon carbide has a density greater than 2 7 g/cm$^3$ and wherein the metal-containing sintering aid is selected from the group consisting of boron, boron-containing compounds, aluminum, and aluminum-containing compounds.

4. A method as described in claim 2 wherein the preceramic organopolysiloxane is present at such a level that the free carbon value of the mixture is greater than 0.5 weight percent and wherein the sintered body of silicon carbide has a density greater than 2.7 g/cm$^3$.

5. A method as described in claim 4 wherein the preceramic organopolysiloxane contains [RSiO$_{1.5}$] and [R$^2$SiO] units where each R is independently selected from the group consisting of hydrogen, alkyl radicals containing 1 to 20 carbon atoms, phenyl radicals, and vinyl radicals and wherein sintering is carried out without pressure.

6. A method as described in claim 5 wherein the preceramic organopolysiloxane is present at such a level that the free carbon value of the mixture is between 0.5 and 3.0 weight percent.

7. A method as described in claim 6 wherein the preceramic organopolysiloxane is present at such a level that the free carbon value of the mixture is between 1.0 and 2.0 weight percent.

8. A method as described in claim 5 wherein the preceramic organopolysiloxane is described by the unit formula

[PhSiO$_{1.5}$]MeSiO$_{1.5}$][PhViSiO]

where there are 10 to 90 mole percent [PhSiO$_{1.5}$]units, 0 to 50 mole percent [MeSiO$_{1.5}$]units, and 10 to 90 mole percent [PhViSiO]units.

9. A method as described in claim 8 wherein there are 20 to 30 mole percent [PhSiO$_{1.5}$]units, 30 to 50 mole percent [MeSiO$_{1.5}$]units, and 30 to 50 mole percent [PhViSiO]units and wherein the preceramic organopolysiloxane is present at such a level that the free carbon value of the mixture is between 0.5 and 3.0 weight percent.

10. A method as described in claim 8 wherein the metal-containing sintering aid is boron or boron carbide.

11. A method as described in claim 4 wherein the handleable green body is sintered at a temperature of 2000° to 2200° C. to obtain a sintered body of silicon carbide with a density greater than 2.9 g/cm$^3$.

12. A method as described in claim 9 wherein the handleable green body is sintered at a temperature of 2000° to 2200° C. to obtain a sintered body of silicon carbide with a density greater than 2.9 g/cm$^3$.

13. A method as described in claim 12 wherein the handleable green body is sintered at a temperature of about 2150° C.

14. A method of forming a handleable green body, which method comprises
(a) preparing an intimate mixture consisting essentially of silicon carbide powder, a metal-containing sintering aid, and a preceramic organopolysiloxane, where the metal-containing sintering aid is present at 0.1 to 3.0 weight percent of the metal based on the weight of silicon carbide powder and where the preceramic organopolysiloxane is present at such a level that the free carbon value of the mixture is greater than 0.2 weight percent based on the total weight of the silicon carbide powder and the char derived from the preceramic organopolysiloxane: and
(b) forming the intimate mixture into the desired shape under pressure at a temperature less than about 500° C.

15. A method as described in claim 14 wherein the free carbon value of the preceramic organopolysiloxane is determined, prior to preparing the intimate mixture, by heating a known amount of the preceramic organopolysiloxane under an inert atmosphere to an elevated temperature for a time sufficient to convert the preceramic organopolysiloxane into a stable ceramic char material, determining the ceramic char yield and the silicon and carbon content of the stable ceramic char material, and then calculating the amount of free carbon in the stable ceramic char material per part of the preceramic organopolysiloxane and wherein the metal-containing sintering aid is selected from the group consisting of boron, boron-containing compounds, aluminum, and aluminum-containing compounds.

16. A method as described in claim 14 wherein the preceramic organopolysiloxane is present at such a level that the free carbon value of the mixture is greater than 0.5 weight percent and wherein the metal-containing sintering aid is selected from the group consisting of boron, boron-containing compounds, aluminum, and aluminum-containing compounds.

17. A method as described in claim 15 wherein the preceramic organopolysiloxane is present at such a level that the free carbon value of the mixture is greater than 0.5 weight percent.

18. A method as described in claim 17 wherein the preceramic organopolysiloxane contains [RSiO$_{1.5}$]and [R$^2$SiO]units where each R is independently selected from the group consisting of hydrogen, alkyl radicals containing 1 to 20 carbon atoms, phenyl radicals, and vinyl radicals.

19. A method as described in claim 18 wherein the preceramic organopolysiloxane is present at such a level that the free carbon value of the mixture is between 0.5 and 3.0 weight percent.

20. A method as described in claim 19 wherein the preceramic organopolysiloxane is present at such a level that the free carbon value of the mixture is between 1.0 and 2.0 weight percent.

21. A method as described in claim 19 wherein the preceramic organopolysiloxane is described by the unit formula

[PhSiO$_{1.5}$][MeSiO$_{1.5}$][PhViSiO]

where there are 10 to 90 mole percent [PhSiO$_{1.5}$ units, 0 ] to 50 mole percent ]MeSiO$_{1.5}$] units, and 10 to 90 mole percent [PhViSiO] units.

22. A method as described in claim 21 wherein there are 20 to 30 mole percent [PhSiO$_{1.5}$] units, 30 to 50 mole percent [MeSiO$_{1.5}$] units, and 30 to 50 mole percent [PhViSiO] units.

23. A method as described in claim 21 wherein the metal-containing sintering aid is boron or boron carbide.

24. A uniform mixture consisting essentially of silicon carbide powder, a metal-containing sintering aid, and a preceramic organopolysiloxane, where the metal-containing sintering aid is present at 0.1 to 3.0 weight percent of the metal based on the weight of silicon carbide powder and where the preceramic organopolysiloxane is present at such a level that the free carbon value of the mixture is greater than 0.2 weight percent based on the total weight of the silicon carbide powder and the char derived from the preceramic organopolysiloxane.

25. A uniform mixture as described in claim 24 wherein the preceramic organopolysiloxane is present at such a level that the free carbon value of the mixture is greater than 0.5 weight percent and wherein the metal-containing sintering aid is selected from the group consisting of boron, boron-containing compounds, aluminum, and aluminum-containing compounds.

26. A uniform mixture as described in claim 25 wherein the preceramic organopolysiloxane contains [RSiO$_{1.5}$] and [R$^2$SiO] units where each R is independently selected from the group consisting of hydrogen, alkyl radicals containing 1 to 20 carbon atoms, phenyl radicals, and vinyl radicals.

27. A uniform mixture as described in claim 26 wherein the preceramic organopolysiloxane is present at such a level that the free carbon value of the mixture is between 0.5 and 3.0 weight percent.

28. A uniform mixture as described in claim 27 wherein the preceramic organopolysiloxane is present at such a level that the free carbon value of the mixture is between 1.0 and 2.0 weight percent.

29. A uniform mixture as described in claim 27 wherein the preceramic organopolysiloxane is described by the unit formula $$[PhSiO_{1.5}][MeSiO_{1.5}][PhViSiO]$$

where there are 10 to 90 mole percent $[PhSiO_{1.5}]$ units, 0 to 50 mole percent $[MeSiO_{1.5}]$ units, and 10 to 90 mole percent [PhViSiO] units.

30. A uniform mixture as described in claim 29 wherein there are 20 to 30 mole percent $[PhSiO_{1.5}]$ units, 30 to 50 mole percent $[MeSiO_{1.5}]$ units, and 30 to 50 mole percent [PhViSiO] units.

31. A uniform mixture as described in claim 29 wherein the metal-containing sintering aid is boron or boron carbide.

* * * * *